United States Patent Office 3,236,837
Patented Feb. 22, 1966

3,236,837
CERTAIN OCTAHYDRO-1,5-DIAZOCINE-3,7-DIOL
COMPOUNDS
Van R. Gaertner, Ballwin, Mo., assignor to Monsanto
Company, a corporation of Delaware
No Drawing. Filed July 23, 1963, Ser. No. 296,910
12 Claims. (Cl. 260—239)

This invention is related to heterocyclic nitrogen compounds. More particularly, this invention provides a novel group of heterocyclic nitrogen compounds, and processes for preparing them.

It is an object of this invention to provide a new class of substituted heterocyclic nitrogen-containing compounds.

It is a more specific object of this invention to provide a new class of saturated azocinediols.

It is another object of this invention to provide processes for preparing the saturated azocinediols.

Other objects, aspects, and advantages of this invention will become apparent from reading the description set forth hereinafter.

According to one aspect of this invention there is provided a new class of saturated azocinediols which are ring compounds containing hydroxyl substituents on ring carbon atoms thereof. These compounds may be described as having the structural formula

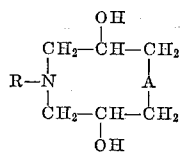

wherein R is selected from the group consisting of alkyl radicals having from 1 to 18 carbon atoms, cycloalkyl radicals having from 3 to 8 carbons, aryl radicals having from 6 to 12 carbon atoms, aralkyl radicals having from 7 to 12 carbon atoms, and said alkyl, aryl, and aralkyl radicals substituted with non-interfering groups such as halogen, lower alkyl, formyl, carboxyl, sulfonyl, lower alkoxyl, lower carboalkoxyl, lower acyl (—C(O)-alkyl)

lower aroyl, N-lower alkylcarbamoyl (—C(O)NHR), N,N-di-lower alkylcarbamoyl, and lower acyloxyl and A is bivalent and is selected from the group consisting of —S— and $$-\overset{|}{\mathrm{N}}\mathrm{R}'$$

wherein R' is defined as R is defined above. In the above substituents "lower alkyl" means from 1 to about 6 carbon atoms, and "aroyl" means a phenyl ring-containing radical containing not over about 10 carbon atoms.

These compounds may be named generically as octahydro-1,5-diazocine-3,7-diols, and hexahydro-2-[H]-5-thi-1-azocine-3,7-diols. The "ocine" suffix is used herein to indicate an eight-membered ring containing nitrogen as a ring-forming element and one of the ring nitrogens is the number 1 atom in the ring. A few samples of compounds of this group are:

1,5-diethyl-octahydro-1,5-diazocine-3,7-diol,
1-hexyl-hexahydro-2[H]-5-thi-1-azocine-3,7-diol, and
1 - phenyl - 5 - tert - butyl - octahydro 1,5 diazocine-3,7-diol.

Another aspect of this invention provides four closely related processes for preparing compounds of the types described above. According to the first and preferred variation a diglycidylamine of the formula

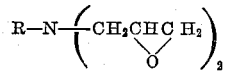

wherein R is as defined above is contacted and reacted with either (a) an amine of the formula R'NH₂ wherein R' is as defined above, and which R' may be the same as or different from the R of the diglycidylamine reactant, to prepare the octahydro-1,5-diazocine-3,7-diol type compounds, or (b) an alkali metal or alkaline earth metal sulfide, or hydrosulfide, or other at least partially water soluble sulfide, or with hydrogen sulfide, to form the hexahydro-2[H]-5-thi-1-azocine-3,7-diol type compound, in the presence of an hydroxyl-containing catalyst or solvent at a temperature of from about —20° C. to about 100° C.

The other methods for preparing these compounds are not as generally useful as is the preferred first method described above, but they confirm the structures of the compound, as well as providing alternative routes to the claimed compounds. In general, these methods may be described as follows:

*Method 2*

This method for preparing the octahydro-1,5-diazocine-3,7-diol compounds comprises dimerizing a monoglycidylamine of the formula

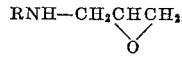

wherein R is as defined above, preferably in the presence of a hydroxyl-containing catalyst and at a temperature of from —20 to 100° C.

*Method 3*

According to this method an N-R-substituted-N,N-bis(3-chloro-2-hydroxypropyl)amine is reacted with N-R-substituted primary amine at a temperature of from about —20° to about 150° C. in a vessel to contain the autogenous pressure, for a time sufficient to insure efficient reaction, periods of up to 18 hours being sufficient for most purposes. After cooling and venting the pressure vessel, the contents may be diluted with water, and treated with a strong base such as sodium hydroxide or potassium hydroxide in excess of that required to neutralize the amine hydrochloride formed. After separating excess base and salt the octahydro-1,5-diazocine-3,7-diol may be isolated by crystallization and/or distillation.

*Method 4*

According to the fourth method an N-(3-halo-2-hydroxypropyl)-2-hydroxy - 1,3 - propylenebis-[N-R-substituted amine], obtained by treating a 2-hydroxy-1,3-propylenebis-(R-substituted amine) with an epihalohydrin at —20° to about 100° C. in the presence of an hydroxyl-containing catalyst, is treated with a strong base such as sodium hydroxide or potassium hydroxide with stirring for a time sufficient to dehydrohalogenate the starting material, periods up to an hour usually being sufficient, separating the excess base and salt which results from the oily N-glycidyl intermediate, and allowing the oily intermediate to stand, preferably dissolved in a lower alkanol until the octahydro-1,5-diazocine-3,7-diol compound is formed.

Each of the methods set forth hereinabove is exemplified in Example 1 given hereinafter.

The diglycidylamines used in the preferred first method of this invention may be prepared by reacting a primary amine of the formula R-NH₂ wherein R is as defined above with an epihalohydrin in sufficient amount to form a reaction product having the formula

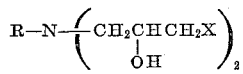

wherein R is as defined above, and X is a halogen selected from the group consisting of bromine, chlorine and iodine, in the presence of an hydroxyl-containing catalyst, and then treating the resulting bis(halopropanol)-amine compound with an aqueous basic material selected from the group consisting of alkali metal and alkaline earth metal hydroxides, carbonates, and oxides in an amount sufficient to dehydrohalogenate the above reaction product, preferably in the presence of a dialkyl sulfoxide having from 1 to 4 carbon atoms in each alkyl radical such as dimethyl sulfoxide. When this reaction is completed the excess basic material may be removed from the resulting reaction product to prevent any deleterious side reaction. The process for preparing these diglycidylamines starting materials is described in detail in copending application, Serial No. 202,724, filed June 15, 1962, which is incorporated herein by reference thereto in order to avoid undue length in the specification.

As stated above the preferred first process of this invention for preparing the octahydro-1,5-diazocine-3,7-diols comprises reacting a primary amine with an N,N-diglycidylamine. The primary amine used may be an alkylamine having from 1 to 18 carbon atoms in each alkyl group, but is preferably a lower alkylamine such as ethylamine, n-propylamine, isopropylamine, n-butylamine, isobutylamine, tert-butylamine, mixed amylamines, n- and isohexylamines, although the higher alkylamines such as 2-ethylhexylamine, nonylamine, decylamine, straight and branched chain dodecylamines, pentadecylamine and octadecylamine may be used. These amines may be used as reactants and as the amines from which the N,N-diglycidylamine reactants are prepared. Aralkylamines such as benzylamine, 4-ethylbenzylamine, and 2-phenethylamine may be used. Useful arylamines include aniline, α- and β-naphthylamines and 4-biphenylylamine. Amines of the above described types having non-interfering substituents may also be used. A non-interfering substituent is one which does not react under the conditions of this invention with the amino group or the glycidyl epoxide group involved in the formation of the compounds of the invention. Some such substituted alkyl, aryl, and aralkylamines which may be used are those substituted with halogen, lower alkyl, formyl, carboxyl, sulfonyl, lower alkoxyl, lower carboalkoxyl, aroyl, lower acyl, aroyloxyl, N-lower alkylcarbamoyl, i.e., groups of the formula —C(O)NHR″ where R″ denotes the lower alkyl, N,N-di-lower alkylcarbamoyl, and lower acryloxyl, i.e., groups of the formula —OC(O)R.

Examples of such substituted-R—NH₂ compounds which may be used as reactants or as the amine from which to prepare the N,N-diglycidylamine reactants are 4-chloroaniline, 2,4-dibromoaniline, 3-iodoaniline, pentachloroaniline, 2-chloroethylamine, 4-bromobutylamine, 2-iodopropylamine, 3,5-dichlorobenzylamine, 4-chloro-α-naphthylamine, 3,3′-5,5′ - teterachloro-4-aminobiphenyl the o-, m-, and p-toluidines, 4-ethylanilines, the xylidines, 2-methyl-6-tert-butylaniline, p-aminobenzoic acid, metanilic acid, 3-aminobenzaldehyde, 4-methoxyaniline, 4-ethoxy-1-naphthylamine, 3,5-dimethoxyaniline, 6-methanesulfonylhexylamine, 4-benzenesulfonylaniline, 4-carbomethoxybutylamine, 4-carboethoxyaniline, 5-carbopropoxy-2-naphthylamine, 4-aminobenzoic acid, 4-aminobutyric acid, 4-aminopropiophenone, 4-amino-1-acetonaphthone, 3-benzoylpropylamine, 4-amino-N-ethylbenzamide, 3-acetoxyaniline.

The cycloalkylamines having from 3 to about 8 carbon atoms may also be used, e.g., cyclopropylamine, cyclobutylamine, cyclophentylamine, cyclohexylamine, 4-methylcyclohexylamine, cycloheptylamine and cyclo- octylamine may be used both as a reactant and the amine used to make the N,N-diglycidylamine reactant.

In preparing the hexahydro-2[H]-5-thi-1-azocine-3,7-diol compounds of this invention the substituted N,N-diglycidylamine is reacted with an alkali metal sulfide or hydrosulfide or an alkaline earth metal, sulfide or hydrosulfide or other at least partially soluble sulfides which hydrolyze in water to give hydrogen sulfide, or with hydrogen sulfide. Any of the alkali metal sulfides, including lithium, sodium, potassium, rubidium, and cesium sulfides and hydrosulfides may be used. As a practical matter, however, because of cost and availability, sodium and potassium sulfides and hydrosulfides or hydrogen sulfide are preferred. Barium hydrosulfide, calcium sulfhydrate, are examples of alkaline earth metal sulfides and hydrosulfides which may be used.

Examples of octahydro-1,5-diazocine-3,7-diol compounds of this invention and the reactants from which they are prepared are:

1,5-dihexyl - octahydro-1,5-diazocine - 3,7-diol obtained from N,N-diglycidylhexylamine and hexylamine;

1-tridecyl-5-ethyl-octahydro - 1,5-diazocine - 3,7-diol obtained from N,N-diglycidyltridecylamine and ethylamine;

1-cyclohexyl-5-butyl-octahydro-1,5-dioazocine-3,7-diol obtained from N,N-diglycidylcyclohexylamine and butylamine;

1-cyclobutyl-5-cyclopentyl-octahydro-1,5 - diazocine-3,7-diol obtained from N,N-diglycidylcyclopentylamine and cyclobutylamine;

1-phenyl-5-n-octadecyl-octahydro-1,5 - diazocine-3,7-diol obtained from N,N-diglycidylaniline and octadecylamine;

1-(4-chlorophenyl) - 5-benzyl - octahydro-1,5-diazocine-3,7-diol obtained from N,N-diglycidyl-4-chloroaniline and benzylamine;

1-(3,5-dimethylphenyl)-5 - cyclohexyl-octahydro - 1,5-diazocine-3,7-diol obtained from N,N-diglycidyl-3,5-dimethylaniline and cyclohexylamine;

1-α-naphthyl-5-ethyl-octahydro-1,5-diazocine-3,7-diol obtained from N,N-diglycidylethylamine and α-naphthalamine;

1-(4-formylphenyl)-5-phenyl-octahydro-1,5-diazocine-3,7-diol obtained from N,N-diglycidylaniline and 4-aminobenzaldehyde;

1-(4-carboxyphenyl)-5-(4-methoxybutyl)-octahydro - 1,5-diazocine-3,7-diol obtained from N,N-diglycidyl-4-methoxybutylamine and 4-aminobenzoic acid;

1-[(4-carboxyphenoxy)phenyl]-5-butyl - octahydro-1,5-diazocine-3,7-diol obtained from N,N-diglycidylbutylamine and 4-(4-carboxyphenoxy)aniline;

1-(4-propionylphenyl)-5-benzyl - octahydro - 1,5-diazocine-3,7-diol obtained from N,N-diglycidylbenzylamine and 4-aminopropiophenone;

1-(3-benzoylphenyl)-5-cyclohexyl - octahydro-1,5-diazocine-3,7-diol obtained from N,N-diglycidylcyclohexylamine and 3-benzoylaniline;

1-[4-(hexylcarbamoyl)phenyl]-5-(2-ethylhexyl) - octahydro-1,5-diazocine-3,7-diol obtained from N,N-diglycidyl-2 - ethylhexylamine and 4-amino-N-hexylbenzamide;

1-[4 - (N,N-dimethylcarbamoyl)phenyl]-5 - cyclopropyl-octahydro - 1,5 - diazocine - 3,7-diol obtained from 4-(N′,N′-diglycidylamino) - N,N-dimethylbenzamide and cyclopropylamine;

1-[3-propionoxyphenyl]-5-phenyl - octahydro - 1,5-diazocine-3,7-diol obtained from N,N-diglycidylaniline and 3-aminophenyl propionate.

Examples of hexahydro-2[H]-5-thi-1-azocine-3,7-diols of this invention and the reactants from which they are obtained are:

1-pentadecyl-hexahydro-2[H]-5-thi-1-azocine-3,7-diol obtained from N,N-diglycidylpentadecylamine and sodium sulfide;

1-(4 - chlorophenyl) - hexahydro - 2-[H]-5-thi-1-azocine-3,7-diol obtained from N,N-diglycidyl-4-chloroaniline and potassium hydrosulfide;

1-[4-(carbethoxy)phenyl]-hexahydro - 2[H]-5-thi-1-azocine-3,7-diol obtained from N,N-diglycidyl-4-carbethoxyaniline and hydrogen sulfide;

1-cyclopentyl-hexahydro-2[H]-5-thi-1-azocine-3,7-diol obtained from N,N-diglycidylcyclopentylamine and strontium hydrosulfide;

1-(4-formylphenyl)-hexahydro-2[H]-5-thi-1-azocine -3,7-diol obtained from N,N-diglycidyl-4-formylaniline and calcium sulfhydrate;

1-(4-methoxyphenyl)-hexahydro-2[H] - 5-thi-2 - azocine-3,7-diol obtained from N,N-diglycidyl-4-methoxyaniline and potassium sulfide;

1-(4-carbomethoxynaphthyl)-hexahydro-2[H] - 5-thi-1-azocine-3,7-diol obtained from N,N-diglycidyl-4-carbomethoxynaphthylamine and sodium sulfide;

1-[4-(N-ethylcarbamoyl)phenyl] - hexahydro - 2[H]-5-thi-1-azocine-3,7-diol obtained from N,N-diglycidyl-4-amino N-ethylbenzamide and hydrogen sulfide; and 1-[3 - (N,N - dimethylcarbamoyl)phenyl]-hexahydro-2[H]-5-thi-1-azocine-3,7-diol obtained from N',N'-diglycidyl-3-amino-N,N-dimethylbenzamide.

In preparing the saturated 1,5-diazocine or 5-thi-1-azocine-3,7-diols of this invention the N,N-diglycidylamines and primary amine or alkali metal or alkaline earth metal sulfide hydrosulfide, or hydrogen sulfide reactants are contacted in the presence of at least a trace amount of an hydroxyl-containing material, preferably a low molecular weight, volatile alkanol, such as methanol, ethanol, or propanol which can be used as solvent for the reaction mixture as well as the catalyst. The hydroxyl-containing material needed to start the reaction can be supplied in a variety of ways. For example, the small amount of water normally present in some commercially available solvents, such as hexane, heptane, etc. is sufficient to initiate the reaction; also, moisture present in the air is sufficient. However, water is not generally desired as a solvent for this reaction mixture. The hydroxyl-containing material can also be supplied by some of the reaction products since, as indicated above, these products contain hydroxyl groups. Thus the reaction is auto-catalytic. The hydroxyl-containing material can also be any other hydroxyl compound, a few simple examples of which are phenol, alkylene glycols such as ethylene glycol, propylene glycol, organic acids such as acetic acid, propionic acid etc. The provision of the hydroxyl-containing material to catalyze the reaction is critical in the sense that in its absence the desired reaction between the diglycidylamine and the primary amine, alkali metal or alkaline earth metal sulfide, hydrosulfide, or hydrogen sulfide may not take place. However, for most purposes, the small amount of hydroxyl-containing material needed to initiate the reaction can be supplied by any source such as those indicated above with no other requirements as to type, amount, etc. being critical. Solvents which can generally be used for this step of the process include the hydrocarbons which are relatively low-boiling solvents having molecular weights no higher than those approximating hexane, heptane, etc., as well as the lower molecular weight alkanols, such as methanol, ethanol, propanol, isopropanol, butanol, tert-butanol, pentanols, hexanol, and mixtures thereof.

The reaction of this invention is preferably conducted at low temperatures, generally from 20° C. to about 35° C. although temperatures on the order of from −20° C. to about 100° C. may be used at atmospheric pressure. Time periods ranging from less than 1 hour to several days or weeks may be used to effect production of the compounds of this invention. Specific time periods within this range can be optimized by those skilled in the art and will vary depending upon the reactants chosen, the solvent, the temperature used, etc.

The reactants are preferably combined in as nearly stoichiometric equimolar proportions as is practically possible for optimum yield of the saturated azocinediol product although proportions varying from such stoichiometric proportion may be used with some sacrifice in efficiency of the process.

When the process has proceeded to an extent sufficient to warrant recovery of the product therefrom the reaction mixture may be treated according to conventional chemical techniques to separate the product therefrom, including such techniques as fractional distillation, crystallization, solvent extraction, etc. For example, when the reaction is conducted in the presence of a lower alkanol such as methanol which serves both as an hydroxyl-containing catalyst and as a solvent for the reaction mixture, the alkanol used may simply be removed by fractional distillation under vacuum.

The crude saturated azocinediol separated from any solvent is generally at least partially crystalline but may range from liquid to crystalline to gummy residues. The products as prepared are usually mixtures of the cis and trans isomers of the azocinediol compound. Both isomeric forms are prepared by the process of this invention. Liquid products are usually mixtures of the cis and trans isomers. Crystalline products are usually the trans isomer. The crystalline fraction of the product may generally be purified by dissolution in a lower alkyl alkanoate ester such as ethyl acetate or combinations with hydrocarbons such as hexane, heptane, etc. with heating if necessary, cooling, and recrystallizing it. The purification techniques may be repeated several times as necessary to obtain the products in as pure a condition as necessary for the use intended. However, extensive removal of non-crystalline isomers and further purification of the products is not necessary for some applications. For example, when the compounds are used as sanitizers, i.e., as a bacteriostat and/or fungistat, such as in cloth or hand detergent and soap applications, extensive purification is not essential.

The compounds of this invention are useful for a variety of biological toxicant applications, for example as stated above they are useful as santizing chemicals, i.e., as bacteriostats either alone or in suitable commercial detergent and wash water rinse compositions in concentrations on the order of about 1 to 10,000 p.p.m. against such organisms as the bacteria Staphylococcus aureus and Salmonella typhosa. They are also active fungistatic agents against such organisms as Aspergillus niger at concentrations ranging from about 1–1000 p.p.m. For example, 1-tert-butyl-5-phenyl-octahydro-1,5-diazocine-3,7-diol, and 1,5-diphenyl - octahydro - 1,5-diazocine-3,7-diol inhibited the growth of bacteria and fungi at 1000 parts per million. Also, as another example, 1-tert-butyl-hexahydro-5-thi-1-azocine-3,7-diol is effective against bacteria and fungus organisms. These compounds are also useful as intermediates for the preparation of acid salts and esters. Both the saturated 1,5-diazocine-3,7-diols and the 5-thi-1-azocine-3,7-diols are esterified to the acetate esters of the hydroxyl groups in the 3,7-positions on the ring by treating them with acetic anhydride in pyridine. The amine hydrochloride and amine hydrobromide salts of the compounds have also been prepared by treating the lower alkanol solution of the respective 1,5-diazocine-3,7-diol or 5-thi-1-azocine-3,7-diol with dilute aqueous hydrogen halide solutions.

EXAMPLE 1

A solution of 18.5 g. of t-butyldi-(2,3-epoxypropyl)-amine in 101 g. of anhydrous methanol was treated with 7.3 g. of t-butylamine at 20–25° C. and the solution maintained at this temperature by cooling in a water bath. The progress of the reaction was followed by titrating 1 ml. aliquots with standard anhydrous hydrogen bromide in glacial acetic acid to the crystal violet end-point (Durbetaki oxirane analysis). After twenty-eight days 87% of the epoxide content had reacted and further reaction was proceeding very slowly.

The solution was distilled to remove methanol. The residue partially crystallized upon standing overnight. The gummy crystalline mass was dissolved in about 30 ml. of reagent grade ethyl acetate, diluted while hot to 200 ml. with n-hexane and cooled slowly; 4.77 g. of white crystals were deposited; they melted at 122–124° C. Two additional crops totalling 2.66 g. were obtained by twice concentrating the mother liquors and cooling.

The product, 1,5-di(tert-butyl)octahydro-1,5-diazocine-3,7-diol was recrystallized from n-hexane twice, M.P. 124–125° C. (sample A), dried and found to contain 65.17% carbon, 11.90% hydrogen, and 10.98% nitrogen, compared to the theoretical values of 65.1% carbon, 11.7% hydrogen, and 10.8% nitrogen.

The infrared spectrum (as mulls in hexachlorobutadiene and in Nujol) showed major absorption peaks at λ, 2.88 (w.) (hydroxyl) 3.36, 6.36, 6.81, 7.88, 8.16, 8.33, 8.95, 9.32, 9.44, 9.72, 10.17, 11.28, and 12.40 microns.

The nuclear magnetic resonance spectrum (26% solution in deuterochloroform with tetramethylsilane internal reference at 60 mc.) had a singlet ($\tau$, tau) at $\tau$ 8.9 (integration: 18 H) corresponding to the methyl hydrogens of the N-t-butyl groups, a pentuplet from $\tau$ 7.45–6.75. (8 H, symmetrically shielded methylene hydrogens) and a partially resolved multiplet centered about $\tau$ 6.33 combined with a partially superimposed but unresolved multiplet at about $\tau$ 6.16 (4 H, i.e., 2 CH and 2 OH hydrogens).

The same compound was also obtained by three related syntheses which established the nature of the "open-chain" intermediate and, together with the above data, proved the structure conclusively.

*Method 2*

N-(2,3-epoxypropyl)-tert-butylamine (6.5 g.) was dissolved in 50 g. of reagent methanol and maintained at 20–25° for 67 days, followed by heating under reflux for 20 hrs., to dimerize the starting material. Isolated as described above, the crystalline product (1.16 g. in two crops) melted at 123–124° C. (sample B). A mixture with the first sample (A) melted at 123–125° C. and its infrared spectrum was virtually superimposable on that of the first sample (A). The molecular weight was found to be 260 by vapor phase osmometry in acetonitrile, compared to the calculated value of 258.6.

*Method 3*

Impure N - tert - butyl - N,N - bis(3-chloro-2-hydroxypropyl)amine was prepared from 29.3 g. of tert-butylamine and 92.5 g. of epichlorohydrin in 200 g. of methanol, kept at 20–25° for 13 days, then aspirated to 30° C./1 mm. with stirring. This unstable oil had a N.E. (neutralization equivalent) of 243; theory N.E. is 258.2. The impure oil (25.8 g.) and 7.3 g. of tert-butylamine were mixed and charged to a 100 ml. steel vessel which was partially evacuated to remove air and sealed. The bomb was heated rapidly in a cylindrical mantle to an internal mantle temperature of 100° C., then more slowly to 140° C. and maintained at 140±3° C. for 18 hours. The bomb was cooled, vented (odor of isobutylene), and the brittle amber residual mixture of amine hydrochlorides dissolved in water, leaving a trace of oil. Ether was added to dissolve the oil. The ethereal and aqueous solutions were recombined and the 40% aqueous sodium hydroxide solution was added to raise the pH above 13; the ether layer was immediately separated, washed with water, and filtered with charcoal. The oil from the ether layer was distilled at 0.3–1.0 mm. pressure in a short-path still, collecting the total distillate (8.2 g.) from 50 to 220° C. The distillate was dissolved in a mixture of hexane and low-boiling petroleum ether and the solution refrigerated and seeded with sample A; it gave 0.17 g. of sample C, M.P. 122–123.5° C., which was similarly shown to be identical to samples A, B, and D (from Method 4). Since T. Colclough, J. I. Cunneen and C. G. Moore (Tetrahedron, vol. 15, page 187, (1961)), have shown that amines displace halide directly under these conditions, the result is synthetic proof of the assigned structure containing an 8-membered ring.

*Method 4*

A fourth synthesis was accomplished by treating 10.1 g. of 1,3-di-(tert-butylamino)-2-propanol dissolved in 30 g. methanol, with 5.55 g. of epichlorohydrin at 20–25° C. After five days, the solvent and excess epichlorohydrin were aspirated to 30° C./1.5 mm. The crude residual oil had a neutralization equivalent (N.E.) of 148 (theory 147.4) toward hydrogen bromide in acetic acid corresponding to crude N-(3-chloro-2-hydroxypropyl)-1,3-di-tert-butylamino)-2-propanol.

This oil (12.8 g.) was dissolved in 50 ml. of ether and treated with 10 g. of sodium hydroxide pellets, stirred, and treated with 10 g. of potassium hydroxide pellets, and finally stirred one hour. The ether layer was decanted and treated with charcoal twice, filtered, and aspirated, leaving 10.2 g. of an oil, $n_D^{25}$ 1.4685, with apparent N.E.=95.8 (theory for the glycidyl compound corresponding to the above chloropropanol, N.E. of 86.1). This unstable oil was promptly dissolved in 30 g. of methanol and after 34 days at 20–25°, the solution was heated 18 hrs. under reflux. In two crops, 1.48 g. of sample D was isolated; the first, M.P. 122.5–124° C., did not depress the melting points of either samples A or B and the three infrared spectra were essentially superimposable.

EXAMPLE 2

A solution of 5.2 g. of N,N-diglycidylaniline and 2.3 g. of aniline in 30 g. of methanol was maintained at 20–25° C. for 24 days; during this period a gummy solid was gradually deposited. From the supernatant solution and by recrystallization from hexane-ethyl acetate a total of 1.4 g. of 1,5-diphenyl-octahydro-1,5-diazocine-3,7-diol was obtained. A purified sample melted at 212–213° C. and contained 71.97% carbon, 7.23% hydrogen, and 9.11% nitrogen, the calculated values being 72.4% carbon, 7.4% hydrogen, and 9.4% nitrogen; the infrared spectrum (mulls in Nujol and hexachlorobutadiene) showed major absorption peaks at λ, 2.99, 3.34, 6.18, 6.93, 7.20, 7.84, 8.18, 9.44, 9.69, 13.51, 14.50 microns.

Method 2

A solution of 7.5 g. of N-glycidylaniline in 50 g. of methanol was stored at 20–25° for 37 days, a solid being deposited after several days. After recrystallization from ethyl acetate, the colorless crystals of 1,5-diphenyl-octahydro-1,5-diazocine-3,7-diol melted at 212–214° C.; this sample did not depress the melting point of the previous sample and the infrared spectra of the two samples were virtually identical.

EXAMPLE 3

This example illustrates the preparation of 1-alkyl-5-aryl-octahydro-1,5-diazocine-3,7-diols from two complementary pairs of primary amines and diglycidylamines providing unequivocal proof of the assigned structures.

A solution of 18.5 g. of tert-butylbis(2,3-epoxypropyl)amine and a 9.3 g. of aniline in 101.2 g. of methanol was maintained at 20–25° C. for 18 days. The oil remaining after removal of the solvent was distilled at less than 1 mm. The fraction, 17.2 g., boiling at 180–195° C., a colorless glass at room temperature, was dissolved in about 20 ml. of ethyl acetate and diluted while hot with about 200 ml. of hexane. White impure platelets, of 1-tert-butyl-5-phenyl-octahydro-1,5-diazocine-3,7-diol, 7.26 g., separated; M.P. 140–150° C. Recrystallization raised the melting point to 157–158° C.

Similarly from 10.3 g. of N,N-diglycidylaniline and 3.65 g. of tert-butylamine in 50 g. of methanol after 18 days at 20–25° C. was isolated directly by crystallization of the isolated residual oil, 2.27 g. of colorless plates; M.P. 154–157° C. Recrystallization improved this value to 158–159° C.; a mixture of this sample with the sample melting at 157–158° C. was not depressed and the infrared spectra were essentially superimposable. This higher melting sample of 1-tert-butyl-5-phenyl-octahydro-1,5-diazocine-3,7-diol contained 68.76% carbon, 9.45% hydrogen, and 9.69% nitrogen; the calculated percentages for this compound are 69.0% carbon, 9.42% hydrogen, and 10.06% nitrogen respectively.

Further 1 - n - butyl-5-phenyl-octahydro-1,5-diazocine-3,7-diol was obtained from n-butylamine and N,N-diglycidylaniline and also from aniline and n-butylbis(2,3-epoxypropyl)amine. The first sample melted at 133–134° C.; the second at 132–133° C., after recrystallization, and a mixture melted at 132–133.5° C. The first sample contained 68.94% carbon, 8.98% hydrogen, and 9.93% nitrogen, the calculated values also being 69.0% carbon, 9.42% hydrogen, and 10.06% nitrogen.

EXAMPLE 4

This example described the synthesis and degradative proof of structure of a 1-alkyl-hexahydro-2[H]-5-thi-1-azocine-3,7-diol.

A turbid solution of 24.0 g. of disodium sulfide monohydrate in 101 g. methanol was treated with 18.5 g. of tert-butylbis(2,3-epoxypropyl)amine at 20° C. with stirring. Within 5 minutes the temperature had risen spontaneously to 40° C., and an ice-bath was required to cool the mixture to 20° C. Titration of an aliquot revealed that 90% of the oxirane content had reacted within fifteen minutes after the addition. After a total of 2 hours at 20–40° C. the reaction was found by titration to be complete.

When neutralized to the phenophthalein end point with methanolic hydrogen chloride, filtered to remove salt, and aspirated to remove methanol, the mixture gave a wet gum which was dissolved away from the remaining salts with ether. The resulting light yellow dry gum weighed 21.8 g.; it was distilled in a short-path still, distillate being collected at 140–154° C./up to 1 mm. vacuum. The distilled nearly colorless oil partially crystallized; it was dissolved in an equal volume of hot ethyl acetate and treated with about four volumes of hexane, giving 5.9 g. of colorless impure needles in two crops; M.P. 84–89° C. Recrystallization (3 times) gave pure 1 - tert - butyl-hexahydro-2[H]-5-thi-1-azocine-3,7-diol, M.P. 94.5–95° C. This product contained 54.78% carbon, 10.01% hydrogen, 7.01% nitrogen, and 14.93% sulfur; the calculated values were 54.7% carbon, 9.65% hydrogen, 6.39% nitrogen, and 14.6% sulfur.

The first crop of this crude product, 3.7 g. was mixed with about 14 g. (dry) of wet Raney nickel catalyst in 100 ml. of ethanol. After heating the mixture for 2 hours at reflux with stirring, an oil was isolated by filtering away the catalyst, distilling the solvents and extracting the residue with ether, giving principally unchanged starting material. The procedure was repeated using about 11 g. of fresh Raney nickel catalyst in 100 ml. of ethanol; the mixture was refluxed for 27 hours, about 7 g. of fresh catalyst being added after 3 hours. The ethanol was slowly allowed to distill until little solvent remained. The isolated oily residue was distilled in a small modified Claisen flask, the third cut, 0.67 g. boiling at 75–100° C. at 1 mm., $n_D^{25}$ 1.4557, being a viscous oil.

A cooled solution of 21.9 g. of tert-butylamine in 100 g. of methanol was treated with 49 g. of propylene oxide, tightly sealed and kept at 20–25° C. After 7 days, the mixture was distilled, finally at 0.3–0.6 mm. The fourth cut, 30.9 g., B.P. 85° (mainly) —95° C., $n_D^{25}$ 1.4558, contained 63.14% carbon, 12.52% hydrogen, and 7.40% nitrogen, compared with 63.4% carbon, 12.6% hydrogen, and 7.40% nitrogen the calcuated values. The product was relatively pure tert-butyl-bis(2-hydroxy)-1-propyl)amine.

The two samples prepared above were separately subjected to vapor phase chromatography over a 2-ft. 30% Oronite-on-Celite column at 225° C. Both samples contained minor low-boiling contaminants but the major component in each sample gave a symmetrical peak with the same retention time. The liquids corresponding to this peak were collected separately from the two samples at the exit port in tubes cooled with Dry Ice. Their infrared spectra (as neat liquids) were nearly superimposable. That removal of sulfur with replacement by hydrogens gave tert-butyl-bis(2-hydroxy - 1 - propyl)amine conclusively established the assigned structure of the 1-tert-butyl-hexahydro-2[H]-5-thi-1-azocine-3,7-diol.

EXAMPE 5

This example illustrates the interaction of an N-(2,3-epoxypropyl)alkylamine with N-glycidylaniline, giving the "mixed" N-alkyl-N'-aryl-octahydro-1,5-azocine-3,7-diol compounds as well as both possible products in which the groups attached to the nitrogen are the same.

An equimolar mixture of 7.5 g. of freshly distilled N-glycidylaniline and 6.5 g. of 1-(tert-butylamino)-2,3-epoxypropane in 50 g. of methanol was maintained at 20–25° C. for 49 days. After 7 days a small seed crystal of the second sample described in Example 2 was added and it was observed to grow in size while other similar crystals appeared slowly. These crystals were collected and recrystallized; M.P., 210.5–212.5°. A mixture with the product of Example 2 melted at 211.5 to 213° C. The compound was therefore 1,5-diphenyloctahydro-1,5-diazocine-3,7-diol.

The original supernatant solution and rinses were combined and concentrated to near-dryness; the residue was dissolved in two volumes of hot ethyl acetate, diluted to incipient turbidity with hexane, and seeded with the product from Example 3. The resulting crystals were separated and rinsed free of gummy coating; they melted at 154–155.5° C. and a mixture with the sample from Example 3 melted at 154–156.5° C. proving them to be 1-tert-butyl-5-phenyl-1,5-diazocine-3,7-diol.

The above liquors and rinsings were concentrated to dryness leaving a colorless opaque brittle resin, which was extracted with three successive portions of boiling n-hexane. From the hexane a viscous oil which partially crystallized was isolated. It was distilled in a semi-micro short-path still at less than 1 mm. giving a viscous distillate at 160–220° C. (metal bath temperature), which was dissolved in 1 ml. of ethyl acetate and diluted to 10 ml. of hexane. Two types of crystals formed after nearly a month with partial evaporation of solvents: small round impure aggregates (not identified) and a single large clear platelet. The latter melted at 120.5–122° C. after being rinsed and dried; a mixture with the product of Example 1 melted at 120–122° C. and had the identical infrared spectrum. It was therefore 1,5-di-tert-butyl-octahydro-1,5-diazocine-3,7-diol, which is believed to be pure trans-isomeric form of the compound.

EXAMPLE 6

1 - (4-formylphenyl)-5-(4-chlorophenyl)octahydro-1,5-diazocine-3,7-diol is prepared by reacting about 1 molar equivalent of N,N-bis(2,3-epoxypropyl)-4-chloroaniline with about 1 molar equivalent of 4-aminobenzaldehyde in methanol at 20°–25° C., according to the procedure described in Example 1.

EXAMPLE 7

1 - (4-methoxyphenyl)-5-(4-acetyloxybutyl)-octahydro-1,5-diazocine-3,7-diol is prepared by contacting N,N-bis(2,3-epoxypropyl)-4-methoxyaniline with 4-acetyloxyaniline in approximately stoichiometric proportions in the presence of methanol at 20°–30° C. as described in Example 1.

EXAMPLE 8

1 - [4 - (N,N - dimethylcarbamoyl)phenyl]-5-(4-carbo ethoxyphenyl)-octahydro-1,5-diazocine - 3,7 - diol is prepared by reacting 4-[N',N'-bis(2,3-epoxypropyl)]phenyl N,N-dimethylcarbamate with ethyl 4-aminobenzoate in stoichiometric proportions in methanol at 20°–25° C. as described in Example 1.

EXAMPLE 9

1 - cyclohexyl - hexahydro-2[H]-5-thi-1-azocine-3,7-diol is prepared by reacting N,N-bis(2,3-epoxypropyl)cyclo hexylamine with hydrogen sulfide at 20°–30° C. using methanol as a solvent as described in Example 1.

EXAMPLE 10

Following the procedure of Example 4, 1-(3-carbopropoxypropyl)hexahydro - 2[H]-5-thi-1-azocine-3,7-diol is prepared by reacting propyl 3-aminopropionate with calcium sulfhydrate in aqueous methanol at 20°–50° C.

EXAMPLE 11

This example illustrates the synthesis of a saturated diazocinediol subsituted with different alkyl groups on the two ring nitrogen atoms.

A solution of 9.23 g. of t-butyldiglycidylamine in 100 g. of methanol was treated with 3.65 g. of n-butylamine at once and the mixture was maintained at 20–25° for 34 days. After distillation of the solvent the residual oil was distilled, a total of 8.4 g. being collected, the larger part at 142–147°/0.1 mm. The middle cut, $n_D^{25}$ 1.4872, a very viscous oil, had N.E.=127.9 (calcd., 129.2), contained 65.0% carbon, 8.47% hydrogen, and 11.26% nitrogen (calcd., 65.0% C, 11.7% H, 10.83% N) and was therefore 1-n-butyl 5-t-butyloctahydro-1,5-diazocine-3,7-diol. After acetylation with excess acetic anhydride the N.E., based on the diol sample weight, was 126: this negligible decrease confirmed the absence of secondary amine groups in the product.

What is claimed is:
1. A compound of the formula

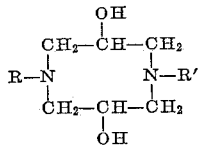

wherein each of R and R' is selected from the group consisting of alkyl radicals having from 1 to 18 carbon atoms, cycloalkyl radicals having from 3 to 8 carbon atoms, hydrocarbon aryl radicals having from 6 to 12 carbon atoms, hydrocarbon aralkyl radicals having from 7 to 12 carbon atoms and said radicals substituted with a member of the group consisting of halogen, lower alkyl, formyl, carboxyl, sulfonyl, lower alkoxyl, lower carboalkoxyl, lower alkyl carboxylic acyl, lower aroyl, N-lower alkylcarbamoyl, N,N-di-lower alkylcarbamoyl, and lower alkyl carboxylic acyloxyl.

2. A compound as described in claim 1 wherein R is lower alkyl of from 1 to 6 carbon atoms, and A is

wherein R' is lower alkyl of from 1 to 6 carbon atoms.

3. A compound as described in claim 1 wherein R is hydrocarbon aryl having from 6 to 10 carbon atoms, and A is

wherein R' is hydrocarbon aryl having from 6 to 10 carbon atoms.

4. A compound as described in claim 1 wherein R is lower alkyl having from 1 to 6 carbon atoms, and A is

wherein R' is hydrocarbon aryl having from 6 to 10 carbon atoms.

5. 1,5-di-tert-butyloctahydro-1,5-diazocine-3,7-diol.
6. 1,5-diphenyloctahydro-1,5-diazocine-3,7-diol.
7. 1-tert-butyl - 5 - phenyloctahydro-1,5-diazocine-3,7-diol.
8. 1-tert-butyl-5-n-butyloctahydro - 1,5 - diazocine-3,7-diol.
9. The process for preparing a saturated azocinediol which comprises contacting and reacting (1) an amine of the formula R—NH₂ wherein R is selected from the group consisting of alkyl radicals having from 1 to 18 carbon atoms, cycloalkyl radicals having from 3 to 8 carbon atoms, hydrocarbon, aryl radicals having from 6 to 12 carbon atoms, hydrocarbon aralkyl radicals having from 7 to 12 carbon atoms, and said radicals substituted with non-interfering groups such as halogen, lower alkyl, formyl, carboxyl, sulfonyl, lower alkoxy, lower carboalkoxyl, lower alkyl carboxylic acyl, lower aroyl, N-lower alkylcarbamoyl, N,N-di-lower alkylcarbamoyl, and lower alkyl carboxylic acyloxyl, with (2) a diglycidylamine compound of the formula

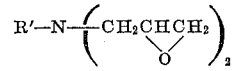

wherein R' is defined as R is defined above, in the presence of an hydroxyl-containing compound, at a temperature of from about −20° C to about 100° C.

10. The process as described in claim 9 wherein the reactant (1) is an amine of the formula R—NH₂ wherein R is alkyl having from 1 to 18 carbon atoms, and reactant (2) is a diglycidylamine wherein R' is an alkyl radical having from 1 to 18 carbon atoms.

11. The process for preparing 1,5-di-tert-butyloctahydro-1,5-diazocine-3,7-diol which comprises contacting and reacting N,N-diglycidyl-tert-butylamine with tert-butylamine in the presence of an hydroxyl-containing catalyst at a temperature of from about 0° C. to about 100° C.

12. The process for preparing 1,5-diphenyloctahydro-1,5-diazocine-3,7-diol which comprises contacting and reacting N,N-diglycidylaniline with aniline in the presence of an hydroxyl-containing catalyst at a temperature of from about 0° C. to about 100° C.

No references cited.

NICHOLAS S. RIZZO, *Primary Examiner.*
JOHN D. RANDOLPH, *Examiner.*